Jan. 8, 1957 A. E. WICKLANDER 2,776,716
MEANS FOR INTRODUCING A FLUID AGENT INTO A TANK
Filed Oct. 10, 1952 3 Sheets-Sheet 1
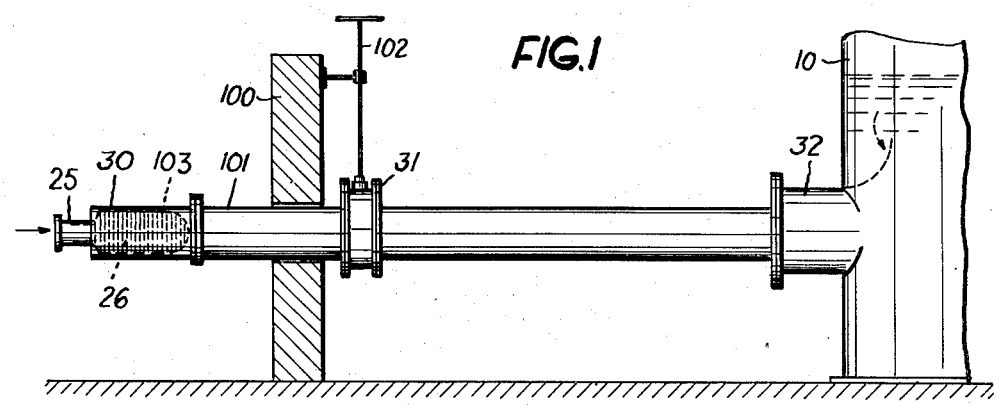
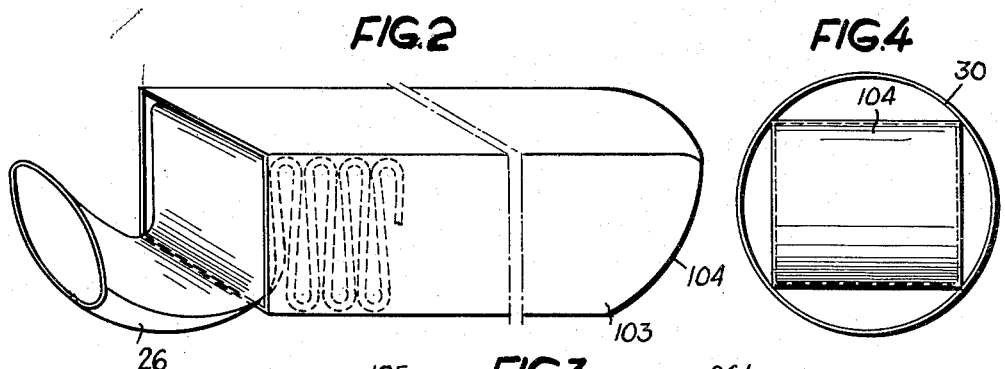
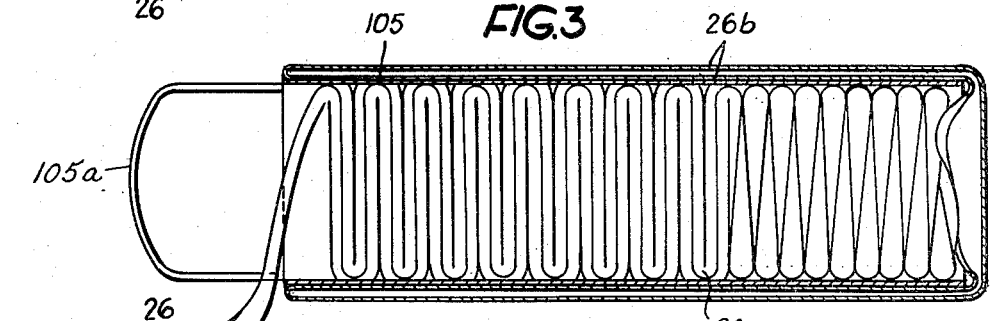
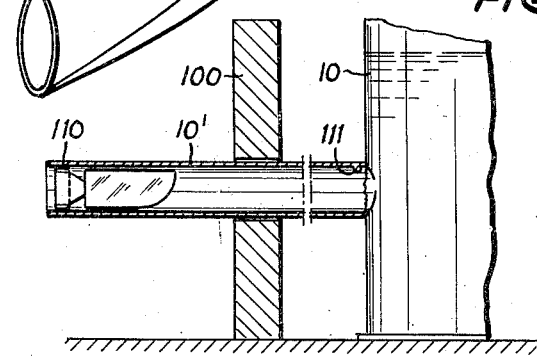
INVENTOR
ANDERS EMANUEL WICKLANDER
BY
ATTORNEY

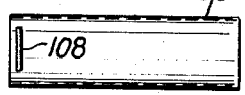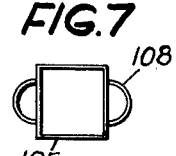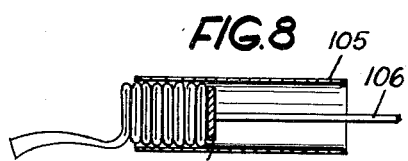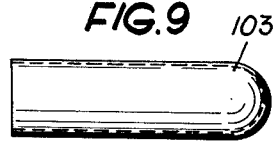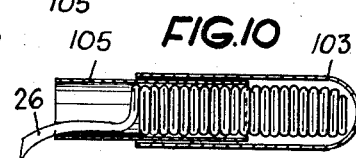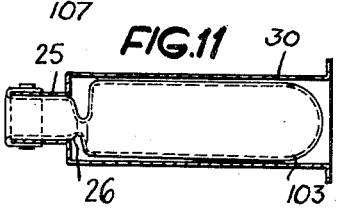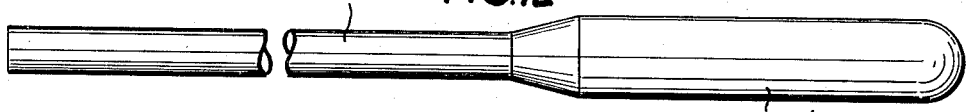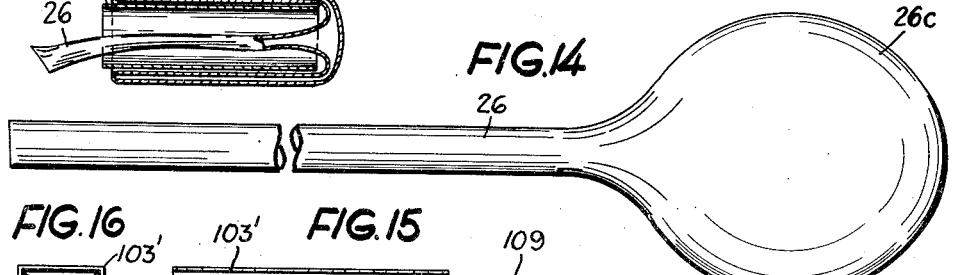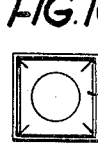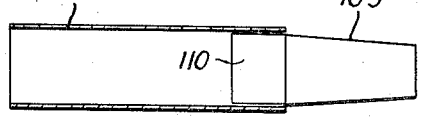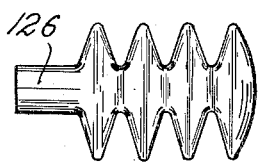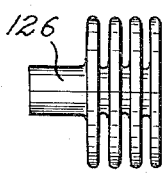

Jan. 8, 1957   A. E. WICKLANDER   2,776,716
MEANS FOR INTRODUCING A FLUID AGENT INTO A TANK
Filed Oct. 10, 1952   3 Sheets-Sheet 3
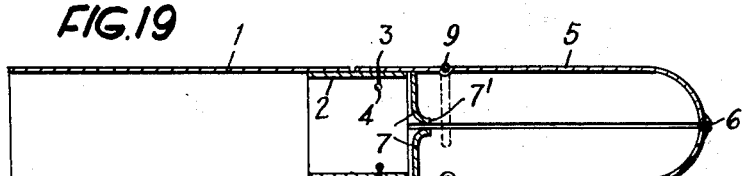
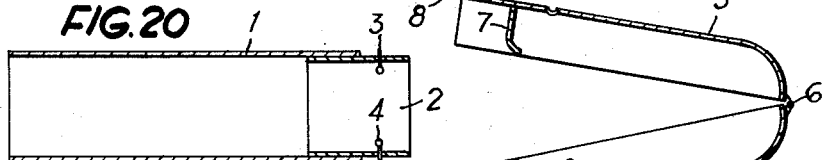
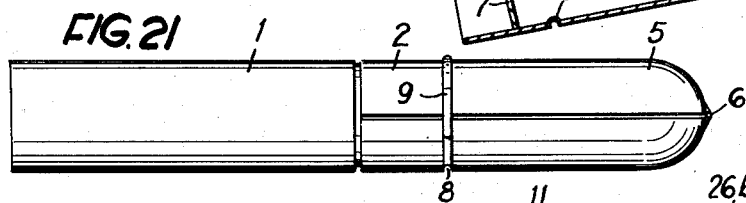
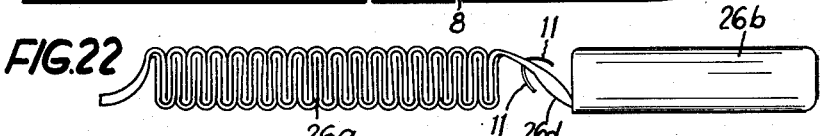
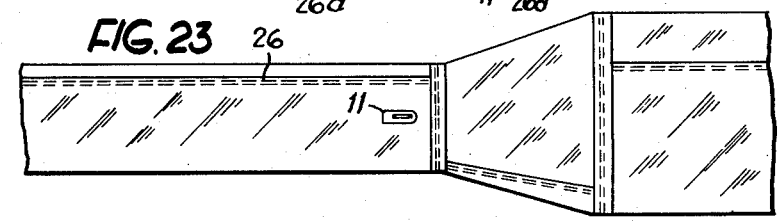
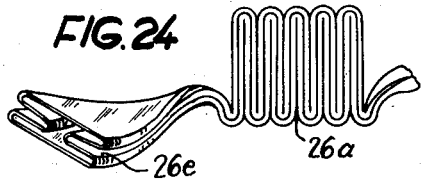
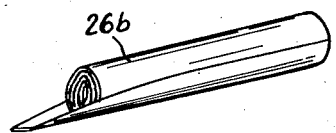
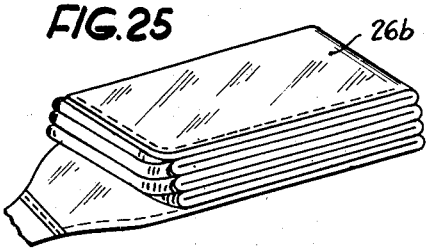
INVENTOR
ANDERS EMANUEL WICKLANDER
BY
ATTORNEY

United States Patent Office 2,776,716
Patented Jan. 8, 1957

2,776,716

MEANS FOR INTRODUCING A FLUID AGENT INTO A TANK

Anders Emanuel Wicklander, Nynashamn, Sweden

Application October 10, 1952, Serial No. 314,057

Claims priority, application Sweden November 9, 1951

16 Claims. (Cl. 169—4)

The invention relates to apparatus for introducing fluid agents into tanks, particularly fire extinguishing foam into tanks for combustible liquids.

An object of the invention is to provide means for introducing fire extinguishing agent from a point located at a distance from the tank, whereby the fireman operating the apparatus is able to take a protected position during the fire.

A further object is to provide a reliable means for sub-surface introduction of fire extinguishing agents under relatively low pressure into the tank.

A still further object of the invention is to provide a suitable shuttle for a flexible tube adapted to reduce the friction during the displacement and development of the flexible tube to the tank.

Another object of the invention is to provide guide means for the hose conducting the foam, said guide means enabling introduction and development of the hose from a folded preparatory state to a state of distribution of the extinguishing foam in the tank.

A few examples of the application of the invention are illustrated in the drawings. Fig. 1 is a diagrammatic view of the apparatus as mounted on the lower portion of a tank wall. Fig. 1a illustrates in the same way as Fig. 1 a modification of the apparatus. Fig. 2 is a perspective view of the casing with the hose packed into the same, according to one embodiment, and Fig. 3 shows a longitudinal section through the same contrivance according to another embodiment of the invention. Fig. 4 is a diagrammatic representation of a cross section through the hose pocket and the hose pack arranged therein. Figs. 5–11, 12, 13 and 14–16 illustrate three different embodiments of the hose and of the manner and means for the packing of the same into the hose pocket. Figs. 17 and 18 show a longitudinal section of an alternative construction of the hose by way of diagrammatic representation. Fig. 19 shows a longitudinal section of the packing means or shuttle in the closed position thereof, and Fig. 20 shows the same in its open condition. Fig. 21 shows the shuttle in its closed position and viewed from the side. Fig. 22 shows a hose which is folded and equipped so as to fit the shuttle shown in Figs. 19–21, and Fig. 23 shows a portion of the same hose to a larger scale. Figs. 24, 25 and 26 are more detailed perspective views to illustrate how the hose is folded and packed.

In the apparatus shown in Fig. 1, a hose pocket 30 is arranged outside a protective wall 100 on the outer end of a conduit 101 extending through this protective wall and connected to the socket 32 on the wall of the tank 10 for inflammable liquid for which the apparatus is intended to be used. A cut-off valve 31, which is preferably constructed as a sluice valve, is arranged in the conduit 101 adjacent to the protective wall 100, so that the handle 102 of said valve is readily accessible. The pocket 30 contains the hose 26, which is folded into a pack and has its outer end secured in a socket 25 of the hose pocket 30 in a sealing manner. The folded portion of the hose is located in a casing 103 open toward the flanged socket 25. Supply of extinguishing agent under pressure to the inlet formed by the socket 25 results in a development and displacement of the hose through the conduit 101 into the tank, the casing 103 guiding the fore portion of the tube and reducing the friction against the wall of the guide conduit 101.

The casing 103, which may consist of fabric, plastic or the like, is open at the one end and closed at the other end in the construction shown in Fig. 2, and at said other end it may be rounded or provided with a forwardly and upwardly inclined end surface 104. The hose lies in a folded condition in the casing and forms a body which is rectangular in cross section. The casing is of a corresponding shape and will consequently bear on the pocket 30 along four lines only, Fig. 4.

In the construction according to Fig. 3, the closed end portion of the hose forms an outer casing for the folded portion of the hose. The folded portion is designated by 26a, and the end portion, which is forced back over the portion 26a so as to form double layers thereon is denoted by 26b. A tube of sheet-metal or the like, which is open at both ends, is designated by 105, and is used in the packing of the hose, after which it is intended to be withdrawn while using a handle 105a secured to one end of the tube 105.

How the packing of the hose may be performed, and how the auxiliary means for the packing may be devised, is shown in the following figures 5–18 in three different alternative constructions.

Fig. 5 shows a hose 26 of uniform thickness with a rounded end portion, and Figs. 6 and 7 are an elevation and an endwise view, respectively, of a sheet-metal tube, which is open at both ends, said tube being used in the packing of the hose. The way of packing is illustrated in Fig. 8, wherein a dolly in the form of a rod 106 with a plate 107 is kept against the end of the hose and moved toward the right in the figure, according as the end of the hose is folded and fed into the tube 105 from the opposite direction. The tube is provided with handles 108 so as to permit of being drawn out of the casing, after the latter has been thrust onto the tube on the packing of the hose having been finished. Fig. 9 shows the casing alone, and Fig. 10 shows the casing as thrust onto the folded portion of the hose. The tube 105 is shown here as being partly pulled out of the casing. After the tube 105 has been removed in its entirety by having been drawn out over the open end of the hose 26, the pack of the hose is introduced into the pocket 30, whereupon the open end of the tube is secured to the socket 25 in a sealing manner, as shown in Fig. 11.

If the hose itself is to form the casing for the folded portion of the tube, it preferably takes the form shown in Fig. 12. The wider end portion 26b is forced back over the sheet-metal tube 105 prior to packing, after said tube has been thrust onto the hose 26 so as to lie in double layers on the outside of the tube 105, as shown in Fig. 11. The remaining narrow portion of the hose is then inserted in folds into the tube 105, whereupon the latter is withdrawn, as in the preceding embodiment.

Fig. 14 shows a hose 26, the closed end of which is formed into a bulb 26c. For the packing of the bulb a special bag 109 from plastic, fabric or the like may be made use of, said bag being provided with four flaps 110 intended to be introduced into one of the end portions of the casing 103' adapted to house the folded portion of the hose. Here, the casing 103' is open at both ends. The hose is packed in the same manner as in Figs. 6–10, whereupon the flaps 110 of the bag 109 containing the bulb are thrust into one end of the casing and into the sheet-metal tube that has been used in the packing, as before. After the hose has been packed, the sheet-metal tube is pulled out.

The folding of the hose may be performed in various ways. If the hose is of a straight cylindrical configuration, it is most simply laid in folds, as shown in Fig. 3, for example. However, the hose may also be constructed as a bellows 126, Fig. 17, and when packed into the casing it then only requires to be compressed, as shown in Fig. 18. The hose with the bulb or with an upper portion enlarged in some other way may also be packed according to Fig. 2, the enlargement being then folded in, after which the folding up is effected in the manner previously described.

In connection with injection of extinguishing agents at low pressure, particular steps should be taken to reduce friction and to release the hose portion injected into the tank. Thus, the casing may be formed as a shuttle made from a stiff, preferably rigid material, said shuttle being adapted to be automatically opened due to the pressure in the hose. An embodiment of such a shuttle is shown in Figs. 19–21 and a corresponding construction of the hose is illustrated in Figs. 22–26.

The shuttle, which is made from sheet-metal, plastic, rubber or other similar material, consists in the construction shown of a tubular, preferably cylindrical rear member 1, which is open at both ends, and of a forward member 5, which is closed at the front and thrust with its rear open end onto a preferably cylindrical guide portion 2. The latter forms at the front a continuation of the rear member 1 and is provided with pins 3 extending through the wall thereof, said pins being terminated on the inside of the guide portion by a button 4. Member 5 is divided in an axial plane, and the two halves thereof may be interconnected at the front by means of a hinge 6. Brought together according to Fig. 19 they are maintained axially in position by means of the pins 4 extending removably through apertures in the two halves. The halves of the forward member 5 are provided with inwardly protruding projections 7 facing each other and providing a space 7' between the inner ends thereof, where the hose is intended to lie flat or at any rate compressed to a certain extent. A wire spring clasp engages a peripherally extending groove 8 so as to keep the hinged halves together.

As shown in Fig. 22, there are provided a pair of straps 11 in the transition 26d between the folded portion 26a of the hose and the forward wider end portion 26b thereof, said straps being adapted to be buttoned onto the pins 3 at the buttons 4 thereof, whereby the shuttle is prevented from sliding up on the larger outlet portion 26b of the hose.

In its folded position of preparedness the hose is housed with the folded narrower portion 26a within the shuttle member 1 and with its forward larger end portion within the forward shuttle member 5, whereas the flatly lying transition 26d is located in the space 7' between the projections 7.

As shown in Fig. 24, the hose may not only be laid in transversely extending folds but also in longitudinally extending folds 26e in the portion 26a. The larger end portion 26b may be folded in transverse folds and be laid in superimposed layers according to Fig. 25, and may then be furled up according to Fig. 26 so as to fit the forward member 5 of the shuttle.

When in use the hose is filled with fire-extinguishing material and swells, it will press the projections 7 outwardly, so that the power of the spring 9 is overcome and the latter releases the forward member 5. The latter then opens and drops away, so that the forward end portion of the hose becomes free. The folded hose is then developed into the tank and the development continues accordingly, as additional fire-extinguishing material is forced into the hose. Thus the forward end of the hose forced into the tank ascends to the surface of the liquid contained therein, whereby the extinguishing means can be admitted to the liquid surface.

The invention is not limited to the embodiments described. The outer end of the hose need not necessarily be secured to the pocket but may be secured to an annular sealing member 110 fitting slidably but with a tight fit to the inside of the conduit 101 (Fig. 1a) while being stopped against an abutment 111 on the wall of the tank or in the conduit near the tank, so that it cannot be entrained into the latter, when the liquid under pressure is admitted into the hose. This construction has the advantage that the hose need not be made so long, inasmuch as the entire hose with the sealing member is thrust here through the conduit in a folded condition, and is deployed only when the sealing member is stopped at the wall of the tank, while the hose is forced further into the tank by the pressure in the hose.

The invention is also applicable to means other than fire extinguishing apparatus.

What I claim is:

1. Means for introducing a fluid agent into a tank for liquid, comprising a flexible tube or hose connected with an inlet for the agent, a casing enclosing said flexible tube or hose in a folded state, guide means for the casing connected with the tank and opening into the latter, the casing being fitted movably in said guide means to be capable of moving through the guide means into the tank.

2. Means for introducing a fluid agent into a tank for liquid, comprising a hose connected with an inlet for the agent, a yieldable bag enclosing the hose in a preparatory state, a guide tube for the bag said guide tube having its one end connected with the tank and opening thereinto, the hose being folded to form a body of substantially polygonal cross section in the bag, so that the bag contacts the inside wall of the tube substantially along lines.

3. Means for introducing an extinguishing agent into a tank for combustible liquid, comprising a flexible tube or hose connected at its one end to an inlet for extinguishing agent and having its other end formed as a casing enclosing a folded intermediate portion of the flexible tube or hose, guide means for said casing opening into the tank, said casing being fitted movably in said guide means to be capable of moving together with a fore portion of the flexible tube or hose into the tank.

4. Means for introducing an extinguishing agent into a tank for combustible liquid, comprising a conduit opening into the tank, a pocket communicating through the conduit with the inside of the tank and provided with means for the connection thereof with a source of extinguishing agent under pressure, a flexible tube or hose open toward said source, a casing enclosing a folded portion of the tube or hose and fitted movably in the pocket, a protecting wall located between said pocket and the tank, the conduit extending through said wall, whereby operation for moving the casing with the fore portion of the flexible tube or hose through the conduit into the tank may take place in a protected position behind the wall.

5. Means for the introduction of extinguishing agent into a tank for combustible liquid, comprising a hose connected with an inlet for the extinguishing agent, a casing enclosing a portion of the hose folded to a pack with a substantially rectangular cross section, and a guide tube with a round cross section adapted to communicate with the tank, the casing being fitted movably in the guide tube so as to be capable of moving therethrough into the tank.

6. Means for the introduction of extinguishing agent into a tank for combustible liquid, comprising a hose connected with an inlet for extinguishing agent and being formed with an enlarged fore end, a casing open at both ends and adapted to enclose an intermediate folded portion of the hose, a bag enclosing the enlarged fore end of the hose folded to a pack, said bag having its mouth fitted into one of the open ends of the casing, a guide tube enclosing the casing and bag and connected with the tank and opening into the latter, the casing with the bag being movably fitted in said tube to enable displacement thereof into the tank.

7. Means for sub-surface introduction of an extinguishing agent into a tank for combustible liquid, comprising a conduit opening into the tank below the liquid level therein, a casing mounted slidably in the conduit for displacement longitudinally thereof, and a flexible tube enclosed in a folded state in the casing to be guided thereby during development of the flexible tube in the conduit and into the tank.

8. Means for sub-surface introduction of an extinguishing agent into a tank for combustible liquid, comprising a conduit opening into the tank below the liquid level therein, a shuttle mounted displaceably in the conduit, a hose communicating with an inlet for extinguishing agent and located with at least a portion thereof in a folded condition in the shuttle, said shuttle being releasable from the hose in the tank as a result of the expansion thereof at admitting the extinguishing agent into the hose.

9. Means for sub-surface introduction of an extinguishing agent into a tank for combustible liquid, comprising a conduit opening into the tank below the liquid level therein, a shuttle comprising a rear tubular member and a fore member removably connected with the rear member and separable therefrom, and a hose enclosed in a folded state in the shuttle and adapted to be connected with an inlet for extinguishing agent under pressure for developing the hose and conveying a portion thereof with the shuttle through the conduit into the tank, the shuttle being adapted to uncover the fore end of the hose by separation of the rear and fore members from one another.

10. Means as claimed in claim 9 and further characterized by the fact that the fore member is divided into hinged parts provided with a projection directed inwardly in the shuttle to form a narrow passage for a flattened portion of the hose, whereby the release of the shuttle occurs automatically as a consequence of the expansion of the hose at the introduction of extinguishing agent thereinto.

11. A shuttle for introduction of a folded hose into a tank, comprising a rear tubular member and a fore member, the fore member being divided into hinged parts fitted removably to the rear member, the parts having projections extending oppositely in the shuttle and forming a narrow passage for a flattened portion of the hose, and attaching means in the shuttle for straps on the hose permitting attachment of the shuttle to the hose.

12. A shuttle for introducing a folded hose into a tank, comprising a rear tubular member and a fore member connected removably to the rear tubular member, the fore member being divided into hinged parts, and a spring clasp keeping the hinged parts together, the hinged parts having a projection providing a narrow passage for the hose in a flattened condition thereof.

13. Means for introducing an extinguishing agent into a tank for combustible liquid, comprising a tube connected with and open to the tank, a casing mounted displaceably in said tube, a bellows enclosed in a compressed condition in the casing and means to admit extinguishing agent under pressure into the bellows to expand and move a portion of the bellows into the tank, the casing being releasable from the bellows in the tank.

14. Means for introducing an extinguishing agent into a tank for combustible liquid, comprising a tube opening into the tank, a pocket opening into the tube, a casing mounted displaceably in the pocket and adapted to be displaced along the tube into the tank, a hose having one of its ends peripherally sealed to the periphery of the pocket and being folded to a pack in the casing, the pocket being provided with means for its connection to a source of extinguishing agent under pressure to enable displacement of the casing while developing the hose in the tube and into the tank by the pressure of said agent.

15. Means for introducing an extinguishing agent into a tank for combustible liquid, comprising a tube opening into the tank beneath the liquid level therein, a casing mounted for displacement along the tube for introduction into the tank, a hose enclosed in the casing in a folded state, a sealing member secured to the outer end of the hose and fitted slidably in the tube, and a stop mounted in the tube for preventing the sealing member to move into the tank.

16. Means for supplying a fire extinguishing agent into a tank containing combustible liquid, comprising a conduit opening to the tank below the liquid level therein, a casing movable in said conduit, a hose connected with an inlet for the fire extinguishing agent and having a portion stored in a folded condition in said casing, and a valve in the conduit between the casing and the tank.

References Cited in the file of this patent

UNITED STATES PATENTS 2,599,796    Wicklander _____ June 10, 1952